US012021822B2

(12) United States Patent
Baughman et al.

(10) Patent No.: US 12,021,822 B2
(45) Date of Patent: Jun. 25, 2024

(54) FORMALIZING INFORMAL AGREEMENTS IN PHYSICAL SPACE AND DIGITAL SPACE

(71) Applicant: International Business Machines Corporation, Armonk, NY (US)

(72) Inventors: Aaron K. Baughman, Cary, NC (US); Jeremy R. Fox, Georgetown, TX (US); Raghuveer Prasad Nagar, Kota (IN); Dinesh Kumar Bhudavaram, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 17/959,927

(22) Filed: Oct. 4, 2022

(65) Prior Publication Data

US 2024/0129270 A1    Apr. 18, 2024

(51) Int. Cl.
*G06F 15/16* (2006.01)
*G06F 40/166* (2020.01)
(Continued)

(52) U.S. Cl.
CPC ............ *H04L 51/56* (2022.05); *G06F 40/166* (2020.01); *G06F 40/20* (2020.01); *G06F 40/30* (2020.01); *H04L 51/212* (2022.05)

(58) Field of Classification Search
CPC ....... H04L 51/56; G06F 40/166; G06F 40/30; G06F 40/20
See application file for complete search history.

(56) References Cited

U.S. PATENT DOCUMENTS 7,690,997 B2    4/2010  Van Luchene et al.
9,264,545 B2    2/2016  Odinak
(Continued)

FOREIGN PATENT DOCUMENTS

CN    113642322 A    11/2021
EP    3467755 A1    4/2019

OTHER PUBLICATIONS

"Semantic Hilbert Space for Text Representation Learning", Wang et al., Proceedings of the 2019 World Wide Web Conference, May 13-17, 2019, 7 pages. (Year: 2019).*
(Continued)

*Primary Examiner* — Joseph R Maniwang
(74) *Attorney, Agent, or Firm* — Zilka-Kotab, P.C.

(57) ABSTRACT

A computer-implemented method includes receiving a communication between first and second users via a communication channel associated with a communication space, and identifying the first user having a first role and the second user having a second role, a formality of the communication is determined based on the second role. The method includes identifying a transformer model for the communication space and monitoring the communication for an agreement clause via the transformer model by deriving an agreement clause based on the communication and classifying the derived agreement clause. The method includes searching a communication platform for an open communication corresponding to the classified agreement clause, and outputting a formal communication response via a communication channel, or outputting a second formal communication response, to the second user via the communication channel in response to finding, or not finding, respectively, the open communication corresponding to the classified agreement clause during the searching.

20 Claims, 6 Drawing Sheets

(51) Int. Cl.
   *G06F 40/20* (2020.01)
   *G06F 40/30* (2020.01)
   *H04L 51/212* (2022.01)
   *H04L 51/56* (2022.01)

(56) References Cited

U.S. PATENT DOCUMENTS

| | | | |
|---|---|---|---|
| 9,808,722 B2 | 11/2017 | Kawachiya et al. | |
| 2015/0379046 A1 | 12/2015 | Sundaresan et al. | |
| 2017/0140486 A1 | 5/2017 | Saxena et al. | |
| 2019/0028520 A1* | 1/2019 | Nawrocki | G06F 40/205 |
| 2019/0318035 A1* | 10/2019 | Blanco | G06F 16/9535 |
| 2020/0387673 A1 | 12/2020 | Beaver | |
| 2021/0389924 A1 | 12/2021 | Chong et al. | |
| 2023/0230572 A1* | 7/2023 | Biadsy | G10L 25/30 704/200 |

OTHER PUBLICATIONS

Subramanya, S.R., "Analysis of Mobile Phone Call Data to Determine User Characteristics and to Enhance User Experience," Proceedings of International Journal of Computer Applications, Apr. 2012, pp. 9-13.

Wikipedia, "Hilbert space," Wikipedia, 2022, 42 pages, retrieved from https://en.wikipedia.org/wiki/Hilbert_space.

Wikipedia, "Bloch sphere," Wikipedia, 2022, 9 pages, retrieved from https://en.wikipedia.org/wiki/Bloch_sphere.

Wikipedia, "Open communication," Wikipedia, 2021, 2 pages, retrieved from https://en.wikipedia.org/wiki/Open_communication.

Wan et al., Abstract Only, "Formalizing and achieving multiparty agreements via commitments," Proceedings of the fourth international joint conference on Autonomous agents and multiagent systems, Jul. 2005, 5 pages.

Vatavu et al., Abstract Only, "Formalizing Agreement Analysis for Elicitation Studies: New Measures, Significance Test, and Toolkit," CHI '15: Proceedings of the 33rd Annual ACM Conference on Human Factors in Computing Systems, Apr. 2015, 4 pages.

Cascavilla et al., Abstract Only, "Counterterrorism for Cyber-Physical Spaces: A Computer Vision Approach," AVI '20: Proceedings of the International Conference on Advanced Visual Interfaces, Sep. 2020, 4 pages.

Falchuk et al., Abstract Only, "The Social Metaverse: Battle for Privacy," IEEE Technology and Society Magazine, vol. 37, No. 2, Jun. 2018, 5 pages.

Melendez Araya et al., Abstract Only, "Collaborative learning through integration of environments real and virtual-immersive," 37th International Conference of the Chilean Computer Science Society (SCCC), Nov. 2018, 3 pages.

Yoon et al., Abstract Only, "Interfacing Cyber and Physical Worlds: Introduction to IEEE 2888 Standards," IEEE International Conference on Intelligent Reality (ICIR), May 2021, 2 pages.

\* cited by examiner

FORMALIZING INFORMAL AGREEMENTS IN PHYSICAL SPACE AND DIGITAL SPACE

BACKGROUND

The present invention relates to formalizing informal agreements in physical space and digital space, and more specifically, this invention relates to formalizing informal agreements using Hilbert spaces.

Many organizations have customer care units. Schools, colleges and public service or emergency related organizations like hospitals, police, electricity dept., metropolitan corporations are adopting newer ways of listening to the public for its concerns and requirements. During these types of communications, a measurement of trust and engagement is monitored by transforming communication channels from the physical environment to the metaverse. Many public service requirements are communicated through social media, virtual meetings, and asynchronous methods such as short message service (SMS), e.g., texting.

However, how to transfer and track interactions, such as agreements and actions, between people through physical and digital space remains elusive.

SUMMARY

In one embodiment, a computer-implemented method includes receiving a communication between first and second users via a communication channel, where the communication channel is associated with a communication space. A role for each of the users is identified where the first user has a first role and the second user has a second role, where a formality of the communication is determined based on the second role. The method proceeds with identifying a transformer model for the communication space and monitoring the communication for an agreement clause via the transformer model. The monitoring includes deriving an agreement clause based on the communication and classifying the derived agreement clause. Further, the method includes searching a communication platform for an open communication corresponding to the classified agreement clause, outputting a formal communication response to the second user via the communication channel in response to finding the open communication corresponding to the classified agreement clause during the searching, and outputting a second formal communication response to the second user in response to not finding the open communication corresponding to the classified agreement clause during the searching.

In another embodiment, an Artificial Intelligence (AI) and Internet of Things (IoT)-based system includes a receiver, where the receiver is connected to IoT sensors, a processor, and logic integrated with the processor, executable by the processor, or integrated with and executable by the processor. The logic is configured to receive a communication between first and second users via a communication channel, where the communication channel is associated with a communication space, identify a role for each of the users, where the first user has a first role and the second user has a second role, where a formality of the communication is determined based on the second role. The logic is further configured to identify a transformer model for the communication space and to monitor the communication for an agreement clause via the transformer model. The monitoring includes deriving an agreement clause based on the communication and classifying the derived agreement clause. Further, the logic is configured to search a communication platform for an open communication corresponding to the classified agreement clause, to output a formal communication response to the second user via the communication channel in response to finding the open communication corresponding to the classified agreement clause during the searching, and to output a second formal communication response to the second user in response to not finding the open communication corresponding to the classified agreement clause during the searching.

Other aspects and embodiments of the present invention will become apparent from the following detailed description, which, when taken in conjunction with the drawings, illustrate by way of example the principles of the invention.

DETAILED DESCRIPTION

Figure 1:
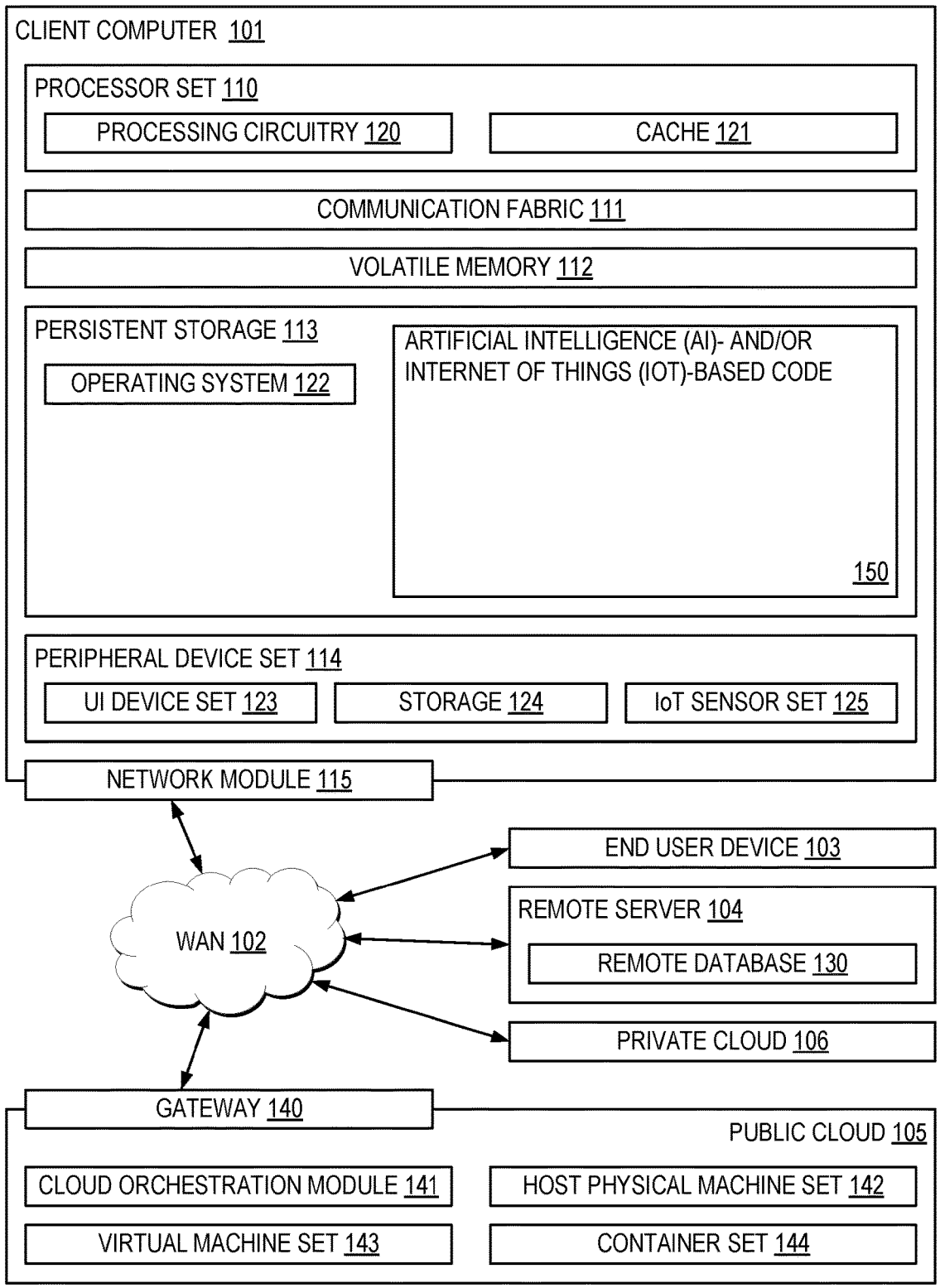
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for formalizing informal agreements in physical space and digital space.

In one general embodiment, a computer-implemented method includes receiving a communication between first and second users via a communication channel, where the communication channel is associated with a communication space. A role for each of the users is identified where the first user has a first role and the second user has a second role, where a formality of the communication is determined based on the second role. The method proceeds with identifying a transformer model for the communication space and monitoring the communication for an agreement clause via the transformer model. The monitoring includes deriving an agreement clause based on the communication and classifying the derived agreement clause. Further, the method includes searching a communication platform for an open communication corresponding to the classified agreement clause, outputting a formal communication response to the second user via the communication channel in response to finding the open communication corresponding to the classified agreement clause during the searching, and outputting a second formal communication response to the second user in response to not finding the open communication corresponding to the classified agreement clause during the searching.

In another general embodiment, an Artificial Intelligence (AI) and Internet of Things (IoT)-based system includes a receiver, where the receiver is connected to IoT sensors, a processor, and logic integrated with the processor, executable by the processor, or integrated with and executable by the processor. The logic is configured to receive a communication between first and second users via a communication channel, where the communication channel is associated with a communication space, identify a role for each of the users, where the first user has a first role and the second user has a second role, where a formality of the communication is determined based on the second role. The logic is further configured to identify a transformer model for the communication space and to monitor the communication for an agreement clause via the transformer model. The monitoring includes deriving an agreement clause based on the communication and classifying the derived agreement clause. Further, the logic is configured to search a communication platform for an open communication corresponding to the classified agreement clause, to output a formal communication response to the second user via the communication channel in response to finding the open communication corresponding to the classified agreement clause during the searching, and to output a second formal communication response to the second user in response to not finding the open communication corresponding to the classified agreement clause during the searching.

A list of acronyms used in the description is provided below.
AI artificial intelligence
AR augmented reality
ASIC application specific integrated circuit
CD-ROM compact disc read-only memory
CPP computer program product
CPU central processing unit
DVD digital versatile disk
EOD end of day
EPROM erasable programmable read-only memory
EUD end user device
FPGA field programmable gate array
GPU graphics processing unit
HDD hard disk drives
IC integrated circuit
I/O input/output
IoT Internet of Things
LAN local area network
NFC Near-Field Communication
NLP natural language processing
NVM nonvolatile memory
RAM random access memory
ROM read-only memory
SAN storage area network
SD secure digital
SDN software-defined networking
SMS short message service
SRAM static random access memory
SSD solid state drive
UI user interface
USB universal serial bus
VCE virtual computing environment
VR virtual reality
WAN wide area network Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a new artificial intelligence (AI)- and Internet of Things (IoT)-based code of block 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and IoT sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2:
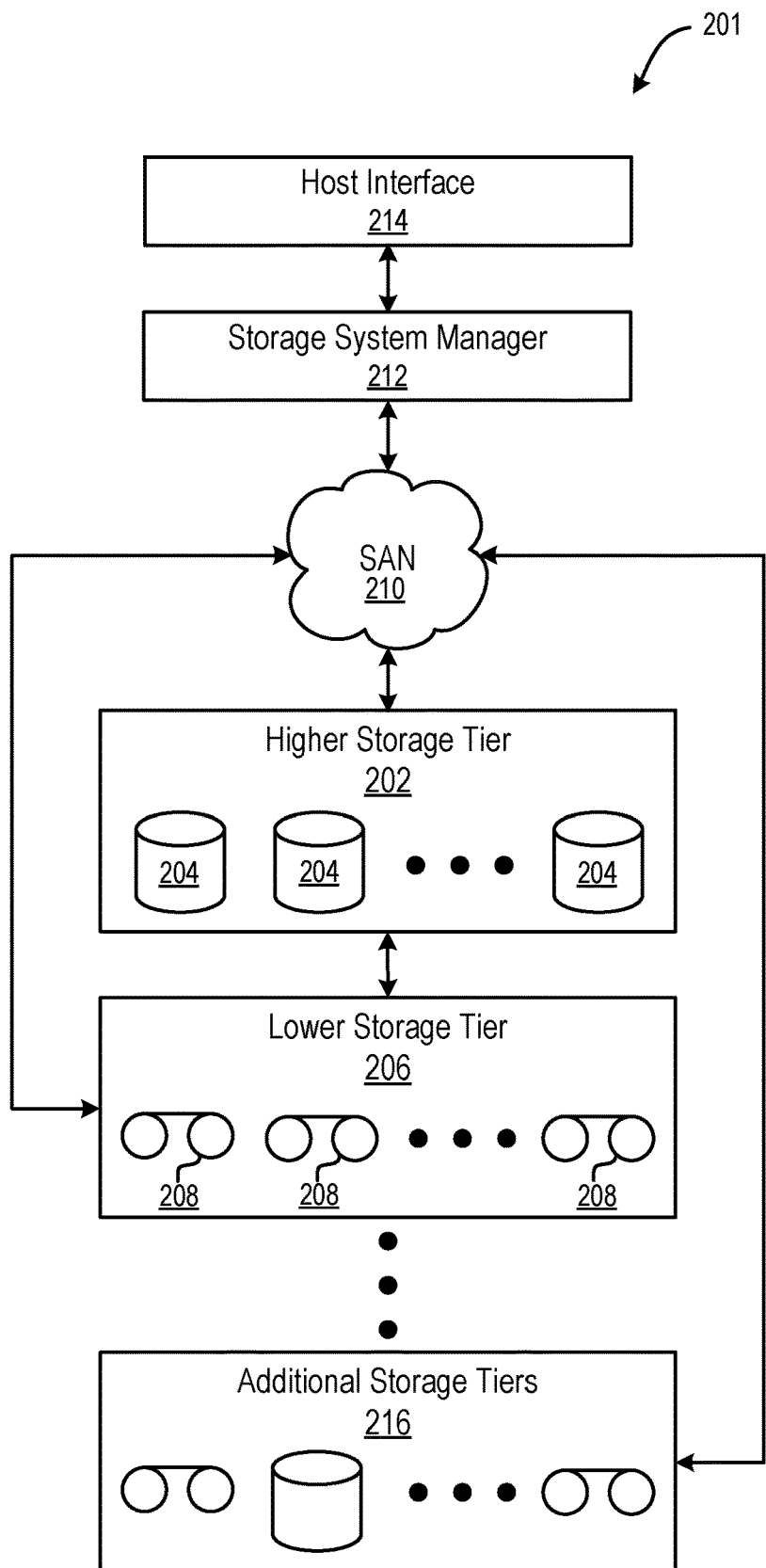
FIG. 2 is a diagram of a tiered data storage system, in accordance with one embodiment of the present invention.

Now referring to FIG. 2, a storage system 201 is shown according to one embodiment. Note that some of the elements shown in FIG. 2 may be implemented as hardware and/or software, according to various embodiments. The storage system 201 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 201. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 201 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 201 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 201) may include logic configured to receive a request to open a data set, logic configured to determine if the requested data set is stored to a lower storage tier 206 of a tiered data storage system 201 in multiple associated portions, logic configured to move each associated portion of the requested data set to a higher storage tier 202 of the tiered data storage system 201, and logic configured to assemble the requested data set on the higher storage tier 202 of the tiered data storage system 201 from the associated portions.

Of course, this logic may be implemented as a method on any device and/or system or as a computer program product, according to various embodiments.

As noted above, many organizations communicate with people via physical as well as digital space. After interactions of people through physical and digital space, the jargon and exophora resolution between contexts becomes important to disambiguate intents of the public and those of the service provider. The language and context between different types of technology mediums are important to transfer requirements with different meanings into a normalized set of understood requirements.

In addition, the interactions between an individual and the organization, where an organization's representative agrees to a certain action, there is no guarantee that the action will be performed, and a tracking method, record, etc. may not exist. If the responsibility shifts by means of a different representative being allotted to the post or change in the department that handles such requests, the communication and the agreed upon actions are lost.

What is needed is a way by which an organization's system not only tracks such agreements and actions but also takes complete ownership of the same.

According to various embodiment described herein, an artificial intelligence (AI)- and IoT-based system and method monitors an organization representative's informal communication with the customer of the organization, derives organizational agreement clauses, and then formalizes the derived clauses using a formal communication. The system may utilize sensors, processing ability, software, etc. of IoT to connect and receive informal communications from a plurality of spaces associated with devices (e.g., smart room, cell phone, computer, etc.) In other approaches, the system may utilize AI-based analysis to extract information, characteristics, linguistics, sentiment, etc. from informal communications. Various embodiments described herein disclose a system and method that uses a Hilbert space on a bloch sphere to select transformer models to normalize language of informal communication into a set of requirements for outputting a formal communication response.

Figure 3:
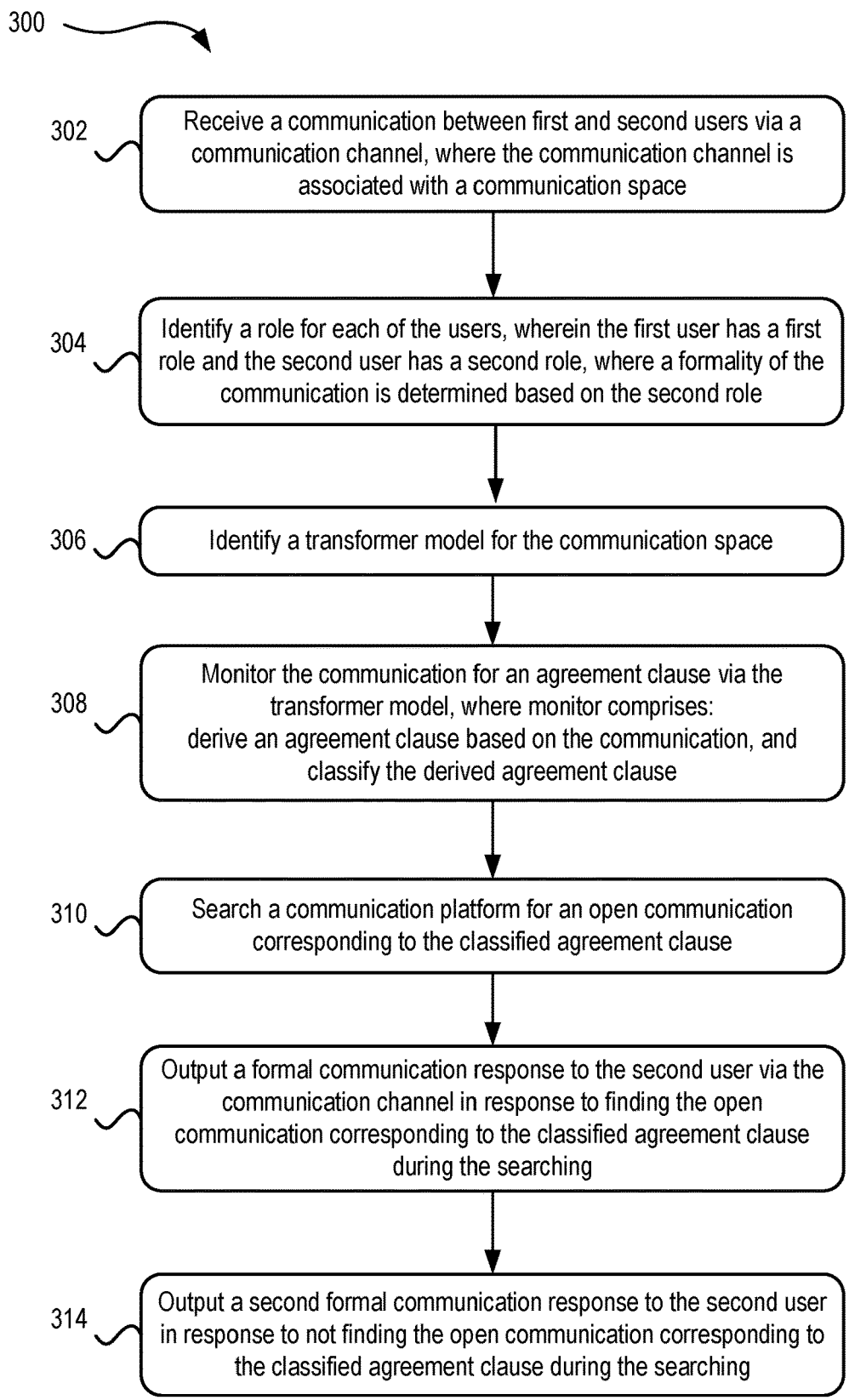
FIG. 3 is a flow chart of a method of formalizing informal agreements, according to one embodiment.

Now referring to FIG. 3, a flowchart of a method 300 is shown according to one embodiment. The method 300 may be performed in accordance with the present invention in any of the environments depicted in FIGS. 1-6, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where the operation includes receiving a communication between first and second users via a communication channel, and where the communication channel is associated with a communication space. The system defines the scope of the communication and identifies different types of communications. For example, some different types of informal communications include a handwritten note, printed documents, email, video, phone calls, different types of natural language processing (NLP) exchanges such as instant messages, slacks, tweets, verbal, email, results of optical character recognition, etc.

According to one embodiment, the system enables a cross of communications produced in different environments (e.g., communication space) and a mechanism to correlate these communications to a language translation model. In one approach, the communication space may include one of the following: a physical space, a virtual space, a digital space, a metaverse, etc. In one approach, there may be a cross of products (e.g., mixing environments) of user metaverse, virtual spaces (e.g., virtual reality (VR)), augmented reality (AR), mixed reality, merge reality and virtual reality, and physical spaces (e.g., an office, location where conversations take place, etc.) to correlate to language translation models.

Operation 304 includes identifying a role for each of the users, wherein the first user has a first role, e.g., representative, and the second user has a second role, e.g., customer. A formality of the communication may be determined based on the second role e.g., customer. The role of the first user may be identified as a representative of a system that implements the method. The role of the second user may include: a customer, a business partner, an organizational representative, etc. In one approach, the roles of an organization representative and the customer may be identified dynamically. For example, A visits school help desk. B attends to A in a smart conference room. Based on the conversation, system derives that A is a parent of a student in the school and B is representing the school.

According to one approach of a system and method, a customer may be a typical customer, a business partner, etc. For example, A, who is the furniture partner of the school, calls school help desk to check when school will pay for the furniture that was delivered last week. B receives the call. B states that A can expect it to be paid by next week. Based on the conversation, system sends an email to A that payment should be expected by next week.

Operation 306 includes identifying a transformer model for the communication space. A plurality of transformer models are selected based on a communication space (or the like). In one approach, more than one transformer model may be identified for the communication between the first user and the second user. Each transformer model may correspond to a different communication space. In one approach, the transformer model may be a language translation model.

In one approach, a method uses a Hilbert space to select transformer models based on language formality, sentiment, and language complexity. Language formality may range between simplistic up to linguistically complex. For sentiment, the system may access an AI-powered sentiment analyzer (e.g., IBM Watson™, etc.). For example, a statement in the communication may be analyzed and analysis would be received that identifies the presence of joy, anger, a combination of sentiments, etc. in the statement. Language complexity includes analysis of grammar, sentence structure, sentence links, word usage, etc. Language complexity may range from simplicity to complexity.

Figure 4:
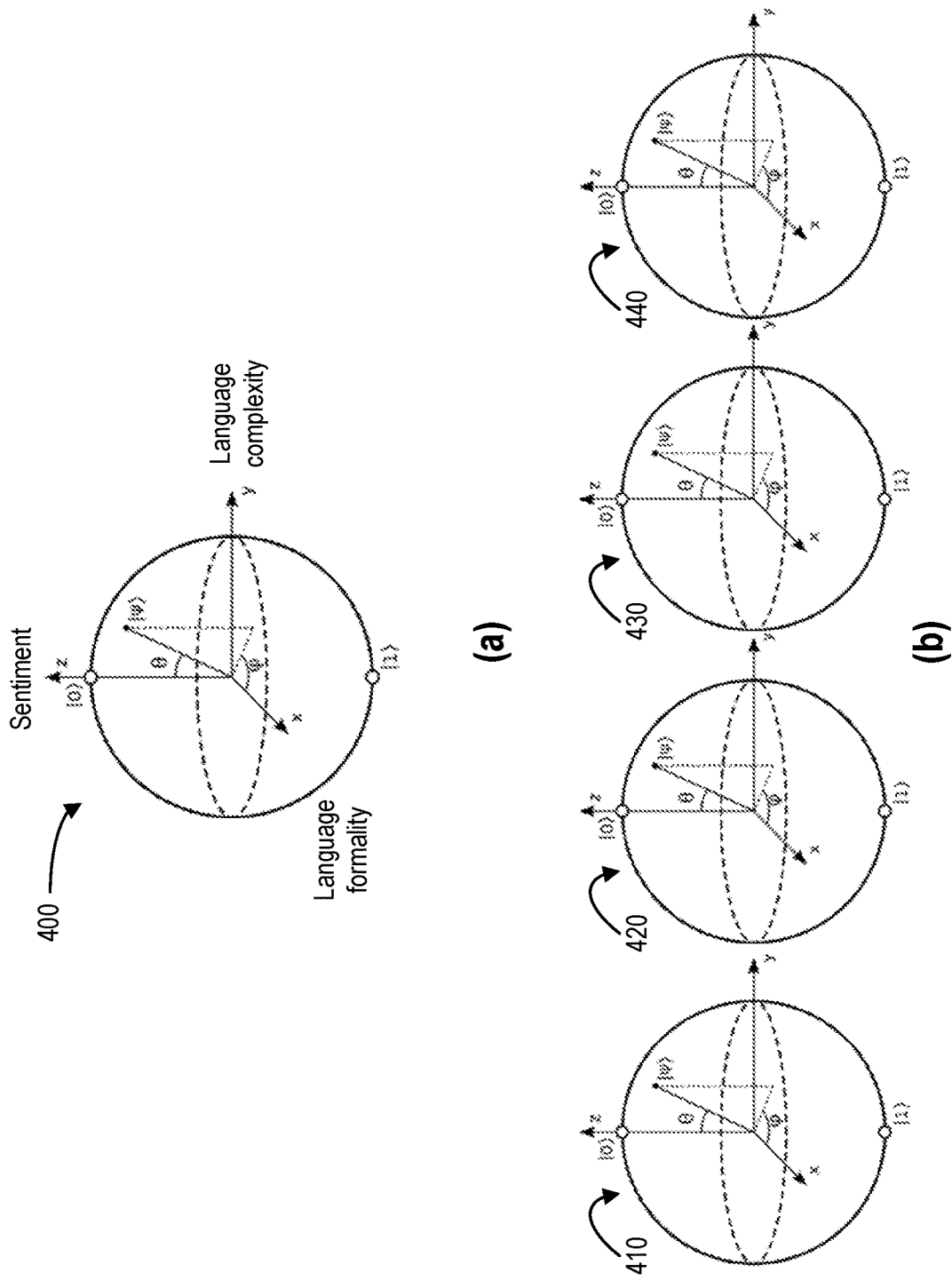
FIG. 4 includes a schematic drawing of bloch spheres representing a communication space, according to one embodiment. Part (a) is a drawing of a bloch sphere with defined dimensions, and part (b) is a series of different bloch spheres representing different communication spaces.

In a preferred approach, the transformer model may be identified using a Hilbert space. A Hilbert space may be derived from the analysis pertaining to language formality, sentiment, and language complexity of a communication. A Hilbert space is a function space that allows the generalization of different methods, equations, functions, etc. A bloch sphere is preferably a two-dimensional Hilbert space corresponding to a pair of mutually orthogonal state vectors. The points on the surface of the sphere correspond to the pure states of the system, and the interior points correspond to mixed states. In one approach, the transformer model includes a Hilbert space based on language formality, sentiment, and language complexity. Part (a) of FIG. 4 illustrates a schematic drawing of a bloch sphere 400. According to one embodiment, each of the dimensions on a bloch sphere 400 may represent language formality, sentiment, and language complexity. For example, as illustrated on the bloch sphere 400, the z-axis represents sentiment or a bit flip, the y-axis represents language complexity, and the x-axis refers to language formality. The position of the user on the bloch sphere determines a T5 transformer that converts the x, y, and z natural language into standardized language for the public service recipient.

The representation of the conversation may be modeled as such:

$$|q\rangle = \alpha|0\rangle + \beta|1\rangle \qquad \text{Equation 1}$$

$$\alpha, \beta \in \mathbb{C}$$

where alpha α and beta β are complex numbers $\mathbb{C}$. Equation 1 may also be extended so that alpha α and beta β are real numbers $\mathbb{R}$ as shown in Equation 2.

$$|q\rangle = \alpha|0\rangle + e^{i\phi}\beta|1\rangle \qquad \text{Equation 2}$$

$$\alpha, \beta, \phi \in \mathbb{R}$$

Moreover, the conversation may be represented as a set of angles φ, θ and the imaginary number i as shown in Equation 3.

$$|q\rangle = \cos\frac{\theta}{2}|0\rangle + e^{i\phi}\sin\frac{\theta}{2}|1\rangle \qquad \text{Equation 3}$$

$$\theta, \phi \in \mathbb{R}$$

The results |q⟩ determines which language transformer to select so that the public service provider understands the content requests.

In some approaches, multiple bloch spheres may represent different spaces. For example, as shown in part (b) of FIG. 4, a bloch sphere 410 may represent the metaverse, a bloch sphere 420 may represent a physical space, a bloch sphere 430 may represent a virtual space, a bloch sphere 440 may represent a to-be-determined space. Each communication space (e.g., environment) has idiosyncrasies, traits, characteristics, etc. of its own. For example, the bloch sphere 410 of the metaverse includes characteristics that the user has a defined avatar associated with a voice, and the avatar may change as the sentiment of the conversation changes. Each bloch sphere may include the following dimensions: z-axis represents sentiment, y-axis represents language complexity, and x-axis represents language formality for each of the designated spaces. Each of the bloch spheres 410, 420, 430, 440 may be used to select a certain language translation service based on the medium of transit. The language translation service of each bloch sphere 410, 420, 430, 440 may be representative of something specific to each form, e.g., audio, video, text, talking face-to-face, etc.

If multiple environment mediums are selected, then the representations of each may be taken as a cross product. For the purposes of this disclosure, a cross product correlates the two representations together, which may then be decoded into two selected translation models that may be ensembled together as shown in Equations 4 and 5.

$$|a\rangle = a_{00}|00\rangle + a_{01}|01\rangle + a_{10}|10\rangle + a_{11}|11\rangle = \begin{bmatrix} a_{00} \\ a_{01} \\ a_{10} \\ a_{11} \end{bmatrix} \quad \text{Equation 4}$$

$$|ba\rangle = |b\rangle \otimes |a\rangle = \begin{bmatrix} b_0 \times \begin{bmatrix} a_0 \\ a_1 \end{bmatrix} \\ b_1 \times \begin{bmatrix} a_0 \\ a_1 \end{bmatrix} \end{bmatrix} = \begin{bmatrix} b_0 a_0 \\ b_0 a_1 \\ b_1 a_0 \\ b_1 a_1 \end{bmatrix} \quad \text{Equation 5}$$

Referring back to FIG. 3, operation 308 of method 300 includes monitoring the communication for an agreement clause via the transformer model. The communication includes a language having a plurality of agreement clauses. The transformer model normalizes the language to a set of requirements.

The monitoring includes deriving an agreement clause based on the communication. For example, the communication between the organization representative and the customer. In one approach, the agreement clause is derived according to the role of the second user. In some approaches, an agreement clause is derived using natural language processing (NLP). In addition, the monitoring includes classifying the derived agreement clause.

Figure 5:
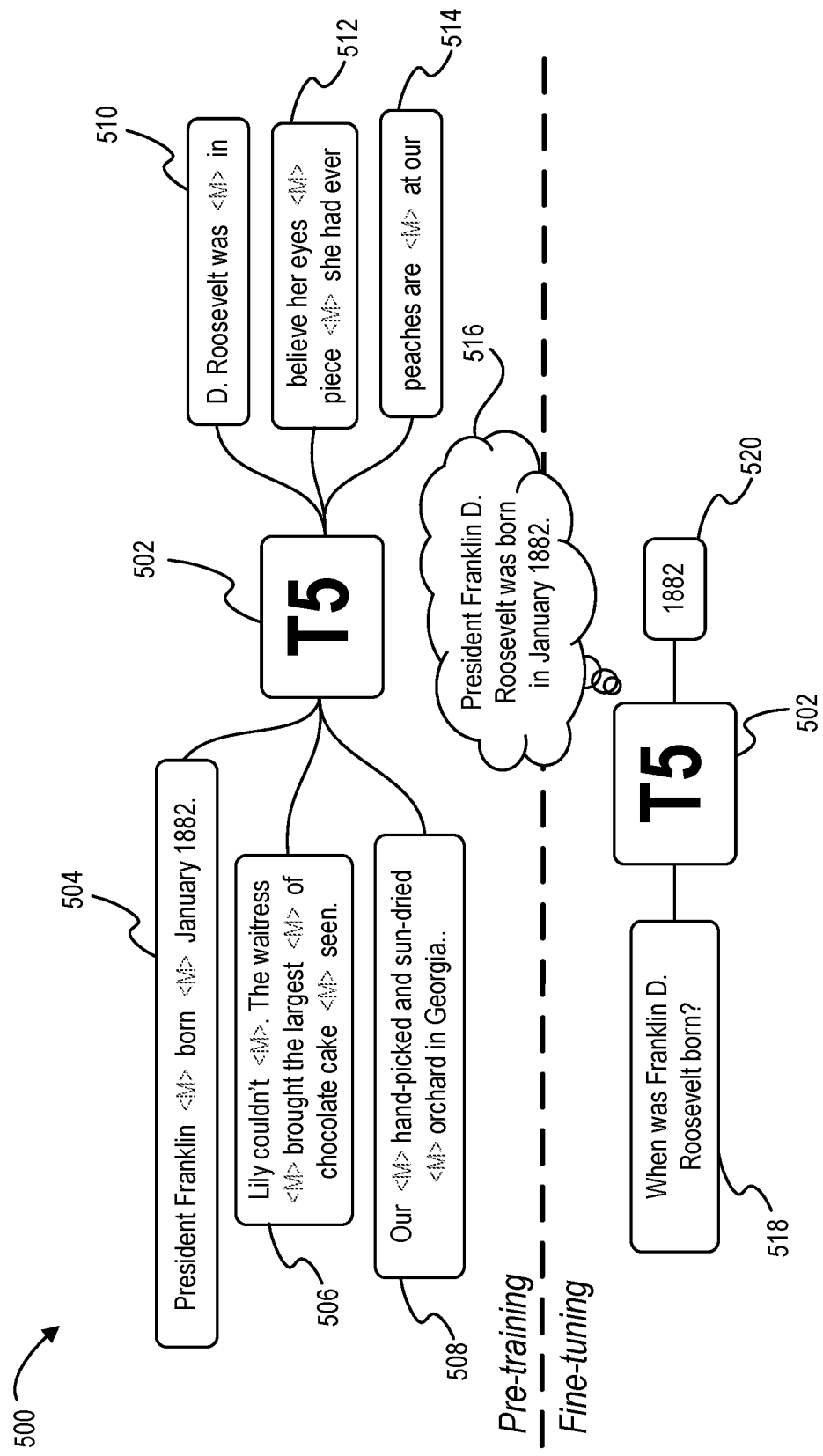
FIG. 5 is a schematic drawing of an example of a language transformer model, according to one embodiment.

In one example, and not to be limiting in any way, a language transformer model 500 is illustrated in FIG. 5. During Pre-training (above dashed line), a language transformer 502 correlates multiple representations 504, 506, 508 in the dimensions of sentiment, language complexity, and language formality and matches complementary representations 510, 512, 514 to result in an appropriate content request 516. During Fine tuning (below dashed line), the appropriate content may be implemented such that the language transformer 502 provides an appropriate response 520 to a request 518.

Referring back to FIG. 3, operation 310 includes searching a communication platform for an open communication corresponding to the classified agreement clause. Open communication may be defined as informal communication that can be accessed, e.g., available to the system, accessed via the cloud, accessed via social platforms, etc. In one approach, the communication platform may be defined by the second user. In one approach, the communication platform may a business where the second user is employed. In another approach, the communication platform may be a business having an account of the second user, e.g., a bank, a store, etc. In yet another approach, the communication platform may be a business having the communication platform and/or the communication space. In one approach, the communication platform may be a business that the second user frequents, e.g., a coffee shop, a restaurant, a bar, etc. In a preferred approach, the open communication is a communication associated with the communication platform.

For the purposes of this disclosure, open communication may be defined as an open access to shared communication resources. For example, open communication may refer to a transparent conversation about quality, ability, pricing, etc.

In some approaches, the method formalizes the communication using an existing formal communication or a new formal communication. For example, an existing formal communication between a school and a parent may entail the school communicating with the parent formally in writing (e.g., a printed letter, an email, etc.). Alternatively, a new formal communication channel may be an instant messaging application (e.g., Facebook® Messenger). For example, the parents prefer to receive communications via social media (e.g., Facebook® Messenger) as a mode of communication, and the parents enable Facebook® Messenger as a new formal communication channel. The new formal communication channel is considered a formal communication between the users (e.g., school and the parents).

An example of such an exchange may be as follows: A visits school help desk to check if a fee has been credited. B attends to A in a smart conference room. Based on the conversation, system derives that A is a parent of a student in the school and B is representing the school. System further derives that B, while talking, checked the accounts and confirmed that the fee has been credited. As soon as the call ends, system sends a reply to A's email in which A had earlier asked if the fee has been credited.

The new formal communication channel defined by the second user (e.g., parent) may be a contract, an e-document signed by the parent, a formal commitment by the parent, etc. to assign the mode of communication to the new formal communication channel. The system determines from the context of the communication (e.g., conversation) the identity of the second user and the preferred mode of formal communication channel associated with the second user. The system monitors an aggregate level of preferably all the different types of information communicated and formalizes the communication to a formal communication channel defined by the user (e.g., the second user, the customer, the representative, etc.).

Operation 312 includes outputting a formal communication response to the second user via the communication channel in response to finding the open communication corresponding to the classified agreement clause during the searching. In one approach, the formality of the formal communication response may be the same formality as an existing formal communication. In another approach, the formal communication response may have a new formality different from an existing formal communication.

In one approach, the method monitors organization representative's informal communication with the customer of the organization, derives organizational agreement clauses, and then formalizes the derived clauses using a formal communication, where the formal communication channel may be dynamically determined. The system may determine over a period of time that the preferred formal communication channel (e.g., model of communication for the formal communication response) may change according to the user's preferences. In one approach, the user may be the representative using the system. In another approach, the user may be a customer interacting with the representative of the system. The system may use machine learning to adjust the preferred formal communication channel according to the preference of the user. The system may determine the communication channel according to the preferences of the user based on the requirements of the system.

In one approach, the system may identify a plurality of formal communication channels associated with a user, and thus the system selects an optimal path for personalization according to the preferences of the user. For example, a preferred formal communication channel may be the most recent formal communication channel used by the user in a communication such that the most recent formal communication channel is the optimal communication channel.

In another approach, the preferred formal communication channel may be selected by weighting the existing formal communication channels. For example, a user may have five existing formal communication channels, and following quantification of the five existing formal communication channels, the top three existing formal communication channels are rated as Priority 1, Priority 2, and Priority 3. The system identifies the formal communication channel having Priority 1 for the formal communication response, however if Priority 1 fails (e.g., no response), the system attempts the outputting of the formal communication response via the formal communication channel having Priority 2 designation.

An example of an exchange may be as follows: A calls school help desk to check if the fee has been credited. B receives the call. Based on the conversation, system derives that A is a parent of a student in the school and B is representing the school. System further derives that B, on the call, checked the accounts and confirmed that the fee has been credited. As soon as the call ends, system determines that a chat message over parent portal is better than sending an email because there is no email pending from A on this subject.

Operation 314 includes outputting a second formal communication response to the second user in response to not finding the open communication corresponding to the classified agreement clause during the searching. In one approach, the second formal communication response may be outputted via a second communication channel. In one approach, the communication channel and the second communication channel are the same. In another approach, the communication channel and the second communication channel are different.

In various approaches, the communication channel may be defined according to the second user. For example, the communication channel may be a channel frequently used by the second user. In another example, the communication channel may be a preferred channel designated by the second user. A communication channel may be one of the following: a document, a phone call, a text message, a digital message, a metaverse message, etc. According to one approach, the formal communication channel determined by the system may be a typical communication or a document.

For example, A calls school help desk to check if the fee has been credited. B receives the call. Based on the conversation, system derives that A is a parent of a student in the school and B is representing the school. System further derives that B, on the call, checked the accounts and confirmed that the fee has been credited. As soon as the call ends, system determines that uploading the receipt on parent portal right away is better than sending a new email and email should be sent only if there is an existing email from A asking for fee receipt confirmation.

In one embodiment, the method further comprises identifying information in the formal communication response. The method identifies information that is expected to be present in the response, and identifies information that may not be necessary in the response. In a preferred approach, the information is identified before the outputting to the second user via the formal communication channel. The information includes one or more of the following: personal information, confidential information, sensitive information, or a combination thereof.

In one approach, after identifying the information in the formal communication response, the method removes, e.g., filters out, deletes, etc. the information from the formal communication response. The system determines whether personal, confidential, sensitive, etc. information is necessary for the response or is preferred to be removed from the response. If the information is indicated to be removed from a formal response, the system will remove the information from the formal communication response. In another approach, the system may anonymize the information in the formal communication response in order to protect personal information.

An example of one exchange may be as follows: A calls school help desk to check if the fee has been credited. B receives the call. Based on the conversation, system derives that A is a parent of a student in the school and B is representing the school. System further derives that B, on the call, checked the accounts and confirmed that the fee has been credited. As soon as the call ends, system sends an email to A without mentioning the account ending number or date of transfer like information which A had told B over the call.

In one approach, the method includes outputting an additional communication response to the second user for emphasizing the formal communication response. The additional communication response may be a voice recording, a short video, a voice mail, etc. of the formal communication response. According to one approach, a system and method may extract and attach the voice recording of a commitment by the representative.

For example, A calls school help desk to check if the fee has been credited. B receives the call. Based on the conversation, system derives that A is a parent of a student in the school and B is representing the school. System further derives that B said B would check and get back by end of day (EOD) today. The call took 5 minutes. As soon as the call ends, system sends an email to A attaching 1 minute audio recording of the part in which B assured A to inform by EOD and A said A looks forward to the same.

Figure 6:
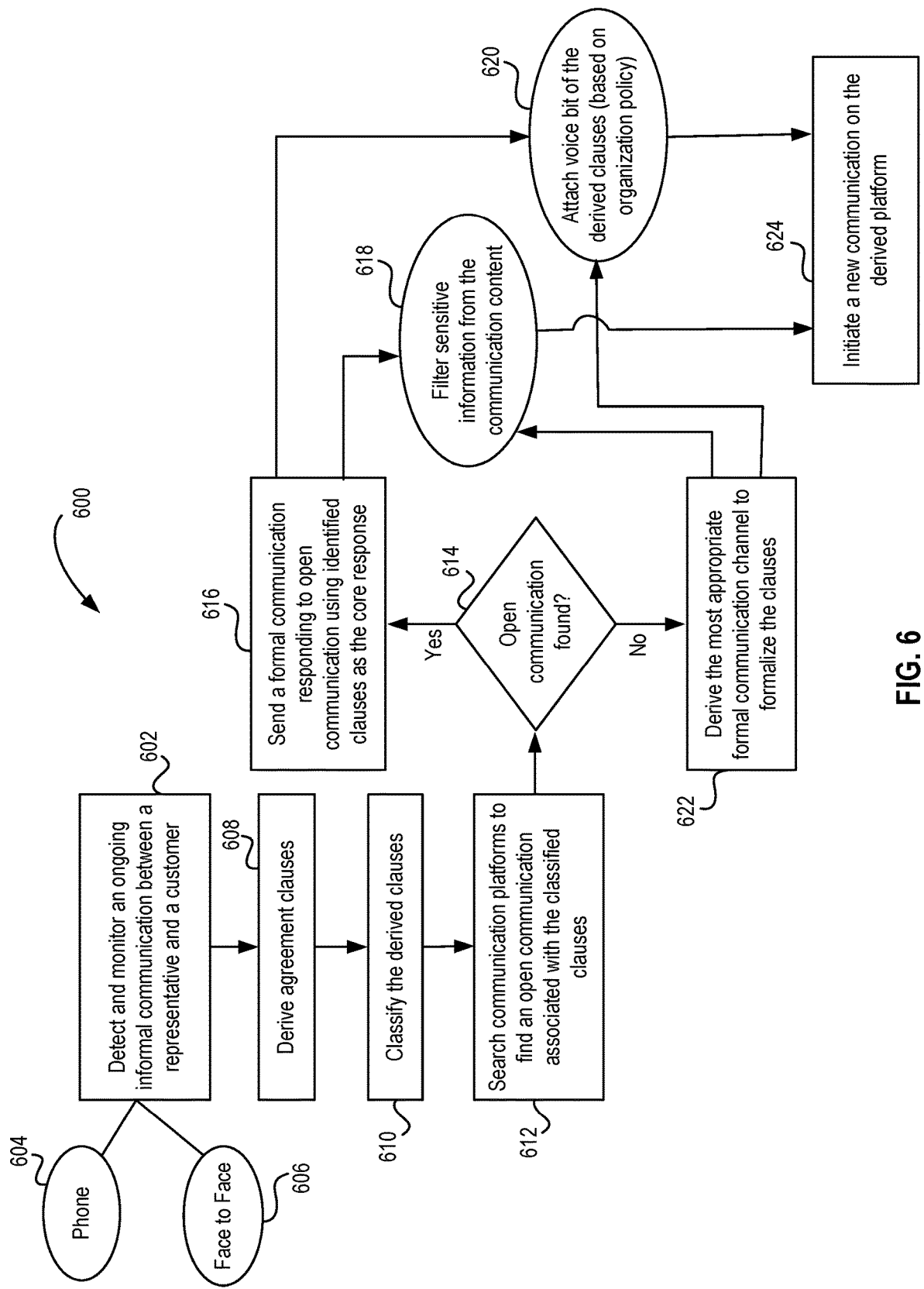
FIG. 6 is a flow chart of a method of an artificial intelligence (AI)- and Internet of Things (IoT)-based system, according to one embodiment.

Now referring to FIG. 6, a flowchart of an example of an AI- and IoT-based method 600, according to one embodiment. The method 600 may be performed in accordance with the present invention in any of the environments depicted in FIGS. 1-5, among others, in various embodiments. Of course, more or fewer operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by computer, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

In one approach of an embodiment, method 600 begins with operation 602 of detecting and monitoring an ongoing informal communication between a representative and a customer. For example, the informal communication may be by phone in operation 604 communication or a face to face communication in operation 606.

Operation 608 includes deriving agreement clauses from the informal communication. Operation 610 includes classifying the derived clauses. Operation 612 includes searching communication platforms to find an open communication associated with the classified clauses.

The system includes a decision 614 of determining whether an open communication is found. If yes, operation 616 includes in response to an open communication being found, the system sends a formal communication using identified clauses as the core response. Operation 618 includes filtering sensitive information from the communication content. In addition, operation 620 includes attaching a voice bit of the derived clauses. Whether to attach the voice bit to the communication may be based on the organizational policy.

If a communication is not found, operation 622 derives the most appropriate formal communication channel to formalize the clauses. The system may also filter sensitive information from the formalized clauses that form a formal communication in operation 618. In addition, the system may attach a voice bit of the derived clauses from the appropriate communication channel in operation 620.

Operation 624 includes initiating a new communication on the derived platform. In one approach, operation 624 may include outputting the new communication via the formal communication channel. In another approach, operation 624 includes outputting the new communication via a new formal communication channel.

In one embodiment, a system and method may include a singular environment approach (e.g., in a Metaverse communication space) such that when both verbal (e.g., voice) and optical video (e.g., sight) may be enabled within a virtual reality type of headset. The system may generate a formal communication in a virtual reality (e.g., Metaverse) type of environment.

It will be further appreciated that embodiments of the present invention may be provided in the form of a service deployed on behalf of a customer to offer service on demand.

According to one embodiment, an AI- and IoT-based system includes a receiver, a processor, and logic integrated with the processor, executable by the processor, or integrated with and executable by the processor. The receiver is connected to the IoT sensors, e.g., smart room with microphones, a connection to a phone, a connection to receive texts, etc. The logic is configured to implement the method as described herein.

In one approach, the logic is configured to receive a communication between first and second users via a communication channel, where the communication channel is associated with a communication space and identify a role for each of the users, wherein the first user has a first role and the second user has a second role, where a formality of the communication is determined based on the second role.

Moreover, the logic is configured to identify a transformer model for the communication space and monitor the communication for an agreement clause via the transformer model. The monitoring includes deriving an agreement clause based on the communication and classifying the derived agreement clause. Then the logic is configured to search a communication platform for an open communication corresponding to the classified agreement clause.

The logic is configured to output a formal communication response to the second user via the communication channel in response to finding the open communication corresponding to the classified agreement clause during the searching, and output a second formal communication response to the second user in response to not finding the open communication corresponding to the classified agreement clause during the searching.

It will be clear that the various features of the foregoing systems and/or methodologies may be combined in any way, creating a plurality of combinations from the descriptions presented above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a communication between first and second users via a communication channel, wherein the communication channel is associated with a communication space;
   identifying a role for each of the users, wherein the first user has a first role and the second user has a second role, wherein a formality of the communication is determined based on the second role;
   identifying a transformer model for the communication space, wherein the transformer model is identified using a Hilbert space;
   monitoring the communication for an agreement clause via the transformer model, wherein the monitoring comprises:
     deriving an agreement clause based on the communication, and
     classifying the derived agreement clause;
   searching a communication platform for an open communication corresponding to the classified agreement clause;
   outputting a formal communication response to the second user via the communication channel in response to finding the open communication corresponding to the classified agreement clause during the searching; and
   outputting a second formal communication response to the second user in response to not finding the open communication corresponding to the classified agreement clause during the searching.

2. The computer-implemented method of claim 1, wherein the communication space is selected from the group consisting of: a physical space, a virtual space, a digital space, and a metaverse.

3. The computer-implemented method of claim 1, wherein more than one transformer model is identified for the communication between the first user and the second user, wherein each transformer model corresponds to a different communication space.

4. The computer-implemented method of claim 1, wherein the role of the second user is selected from the group consisting of: a customer, a business partner, and an organizational representative, wherein the agreement clause is derived according to the role of the second user.

5. The computer-implemented method of claim 1, wherein the role of the first user is identified as a representative of a system that implements the method.

6. The computer-implemented method of claim 1, wherein the communication includes a language comprised of a plurality of agreement clauses, wherein the transformer model normalizes the language to a set of requirements.

7. The computer-implemented method of claim 1, wherein the second formal communication response is outputted via a second communication channel.

8. The computer-implemented method of claim 7, wherein the communication channel and the second communication channel are different.

9. The computer-implemented method of claim 1, wherein the communication channel is defined according to the second user.

10. The computer-implemented method of claim 1, wherein the communication platform is defined by the second user.

11. The computer-implemented method of claim 10, wherein the communication platform is selected from the group consisting of: a business where the second user is employed, a business having an account of the second user, and a business that having the communication platform and/or the communication space.

12. The computer-implemented method of claim 1, wherein the open communication is a communication associated with the communication platform.

13. The computer-implemented method of claim 1, further comprises identifying information in the formal communication response.

14. The computer-implemented method of claim 13, wherein the information is selected from the group consisting of: personal information, confidential information, sensitive information, and a combination thereof.

15. The computer-implemented method of claim 13, comprising, after identifying the information, removing the information from the formal communication response.

16. The computer-implemented method of claim 1, comprising outputting an additional communication response to the second user for emphasizing the formal communication response.

17. The computer-implemented method of claim 16, wherein the additional communication response is a voice recording of the formal communication response.

18. A computer program product, the computer program product comprising a computer readable storage medium having program instructions embodied therewith, the program instructions readable and/or executable by a computer to cause the computer to perform the method of claim 1.

19. A computer-implemented method, comprising:
receiving a communication between first and second users via a communication channel, wherein the communication channel is associated with a communication space;
identifying a role for each of the users, wherein the first user has a first role and the second user has a second role, wherein a formality of the communication is determined based on the second role;
identifying a transformer model for the communication space, wherein the transformer model comprises a Hilbert space based on language formality, sentiment, and language complexity;
monitoring the communication for an agreement clause via the transformer model, wherein the monitoring comprises:
deriving an agreement clause based on the communication, and
classifying the derived agreement clause;
searching a communication platform for an open communication corresponding to the classified agreement clause;
outputting a formal communication response to the second user via the communication channel in response to finding the open communication corresponding to the classified agreement clause during the searching; and
outputting a second formal communication response to the second user in response to not finding the open communication corresponding to the classified agreement clause during the searching.

20. An Artificial Intelligence (AI)- and Internet of Things (IoT)-based system, comprising:
a receiver, wherein the receiver is connected to IoT sensors;
a processor; and
logic integrated with the processor, executable by the processor, or integrated with and executable by the processor, the logic being configured to:
receive a communication between first and second users via a communication channel, wherein the communication channel is associated with a communication space;
identify a role for each of the users, wherein the first user has a first role and the second user has a second role, wherein a formality of the communication is determined based on the second role;
identify a transformer model for the communication space, wherein the transformer model is identified using a Hilbert space;
monitor the communication for an agreement clause via the transformer model, wherein the monitoring comprises:
deriving an agreement clause based on the communication, and
classifying the derived agreement clause;
search a communication platform for an open communication corresponding to the classified agreement clause;
output a formal communication response to the second user via the communication channel in response to finding the open communication corresponding to the classified agreement clause during the searching; and
output a second formal communication response to the second user in response to not finding the open communication corresponding to the classified agreement clause during the searching.

\* \* \* \* \*